(12) United States Patent
Kuwahara

(10) Patent No.: US 10,994,740 B2
(45) Date of Patent: May 4, 2021

(54) VEHICLE DRIVING CONTROL SYSTEM

(71) Applicant: SUBARU CORPORATION, Tokyo (JP)

(72) Inventor: Keisuke Kuwahara, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/708,029

(22) Filed: Dec. 9, 2019

(65) Prior Publication Data

US 2020/0262441 A1 Aug. 20, 2020

(30) Foreign Application Priority Data

Feb. 15, 2019 (JP) .............................. JP2019-025795

(51) Int. Cl.
| | |
|---|---|
| *B60W 40/08* | (2012.01) |
| *B60W 50/12* | (2012.01) |
| *G06K 9/00* | (2006.01) |
| *B60W 30/18* | (2012.01) |
| *B60W 50/00* | (2006.01) |

(52) U.S. Cl.
CPC .......... *B60W 40/08* (2013.01); *B60W 30/181* (2013.01); *B60W 50/12* (2013.01); *G06K 9/00845* (2013.01); *B60W 2040/0818* (2013.01); *B60W 2050/0071* (2013.01)

(58) Field of Classification Search
None
See application file for complete search history.

(56) References Cited

U.S. PATENT DOCUMENTS

| | | | |
|---|---|---|---|
| 2013/0093603 A1* | 4/2013 | Tschirhart | B60K 28/06 340/902 |
| 2016/0001781 A1* | 1/2016 | Fung | G16H 50/20 701/36 |
| 2017/0270798 A1* | 9/2017 | Ushiba | G08G 1/161 |
| 2018/0111628 A1 | 4/2018 | Tamagaki et al. | |
| 2018/0208211 A1* | 7/2018 | Chiba | B60W 50/082 |
| 2019/0073546 A1* | 3/2019 | Aoi | G06K 9/00375 |

FOREIGN PATENT DOCUMENTS

JP 2016-196285 A 11/2016

* cited by examiner

*Primary Examiner* — Thomas S McCormack
(74) *Attorney, Agent, or Firm* — McDermott Will & Emery LLP

(57) ABSTRACT

A vehicle driving control system has an automatic driving mode that enables traveling without a driver's operation. The vehicle driving control system includes a driver monitor that monitors a driver in a vehicle compartment, and detects a driver state, a driver state determining unit that determines, based on the driver state, whether the driver is in a state capable of driving normally, a retreat mode controller that controls a retreat mode that causes an own vehicle to travel for retreat to a place where the own vehicle can safely stop when it is determined, during traveling under the automatic driving mode, that the driver is not in the state capable of driving normally, and a retreat mode canceler that cancels the retreat mode when it is determined, during the travel for retreat, that the driver has returned to the state capable of driving normally.

15 Claims, 4 Drawing Sheets

VEHICLE DRIVING CONTROL SYSTEM

CROSS-REFERENCE TO RELATED APPLICATIONS

The present application claims priority from Japanese Patent Application No. 2019-25795 filed on Feb. 15, 2019, the entire contents of which are hereby incorporated by reference.

BACKGROUND

The technology relates to a vehicle driving control system having an automatic driving mode for enabling traveling without requiring a driver's driving operation.

A system having an automatic driving mode for enabling traveling without requiring a driver's driving operation has been recently developed to be put into practical use for vehicles such as automobiles. In an automatic driving vehicle as described above, when a system determines that it is difficult to continue automatic driving due to malfunction of the vehicle or the like, a driver is required to take over driving and perform manual driving.

In order to reduce a risk that a driver is not capable of taking over driving in spite of such a takeover request from an automatic driving mode to manual driving due to deterioration of the driver's physical condition or the like, it has been known that a vehicle is provided with a retreat mode for automatically stopping the vehicle on behalf of the driver, for example, as disclosed in Japanese Unexamined Patent Application Publication (JP-A) No. 2016-196285.

SUMMARY

An aspect of the technology provides a vehicle driving control system having an automatic driving mode that enables traveling without a driving operation by a driver. The system includes a driver monitor, a driver state determining unit, a retreat mode controller, and a retreat mode canceler. The driver monitor is configured to monitor, as the driver, an occupant who can perform a driving operation in a vehicle compartment, and detect a driver state. The driver state determining unit is configured to determine, based on the driver state, whether the driver is in a state capable of driving normally. The retreat mode controller is configured to control a retreat mode that causes the own vehicle to travel for retreat to a place where the own vehicle can safely stop when the driver state determining unit determines, during traveling under the automatic driving mode, that the driver is not in the state capable of driving normally. The retreat mode canceler is configured to cancel the retreat mode when the driver state determining unit determines, during the travel for retreat, that the driver has returned to the state capable of driving normally.

An aspect of the technology provides a vehicle driving control system. The system includes circuitry configured to operate an automatic driving mode for enabling traveling without requiring a driving operation by a driver. The circuitry is configured to monitor, as the driver, an occupant who can perform a driving operation in a vehicle compartment, and detect a driver state. The circuitry is configured to determine, based on the driver state, whether the driver is in a state capable of driving normally. The circuitry is configured to control a retreat mode for causing the own vehicle to travel for retreat to a place where the own vehicle can safely stop when it is determined, during traveling under the automatic driving mode, that the driver is not in the state capable of driving normally. The circuitry is configured to cancel the retreat mode when it is determined, during the travel for retreat, that the driver has returned to the state capable of driving normally.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

A description is given below of some embodiments of the technology with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following embodiments which are not recited in a most-generic independent claim of the disclosure are optional and may be provided on an as-needed basis. The drawings are schematic and are not intended to be drawn to scale.

A conventional system having an automatic driving mode has been designed so that once a driving mode is transitioned to a retreat mode and traveling for retreat is started, the retreat mode cannot be canceled until a cancel switch is pushed or the like in order to prevent the traveling for retreat from being interrupted by an erroneous operation.

For this reason, when the automatic driving mode has transitioned to the retreat mode due to the driver's temporary inattentive driving or drowsy driving, or when the automatic driving mode transitions to the retreat mode due to deterioration of the driver's physical condition, but the driver's physical condition then recovers to a normally drivable physical condition before the vehicle reaches a retreat point, the driver has to wait until the vehicle reaches the retreat point and the retreat mode is canceled, which may make the driver feel bothered.

Therefore, it is desirable to provide a vehicle driving control system that can safely cancel a retreat mode according to the state of a driver even halfway through traveling for retreat after an automatic driving mode has been transitioned to the retreat mode.

Figure 1:
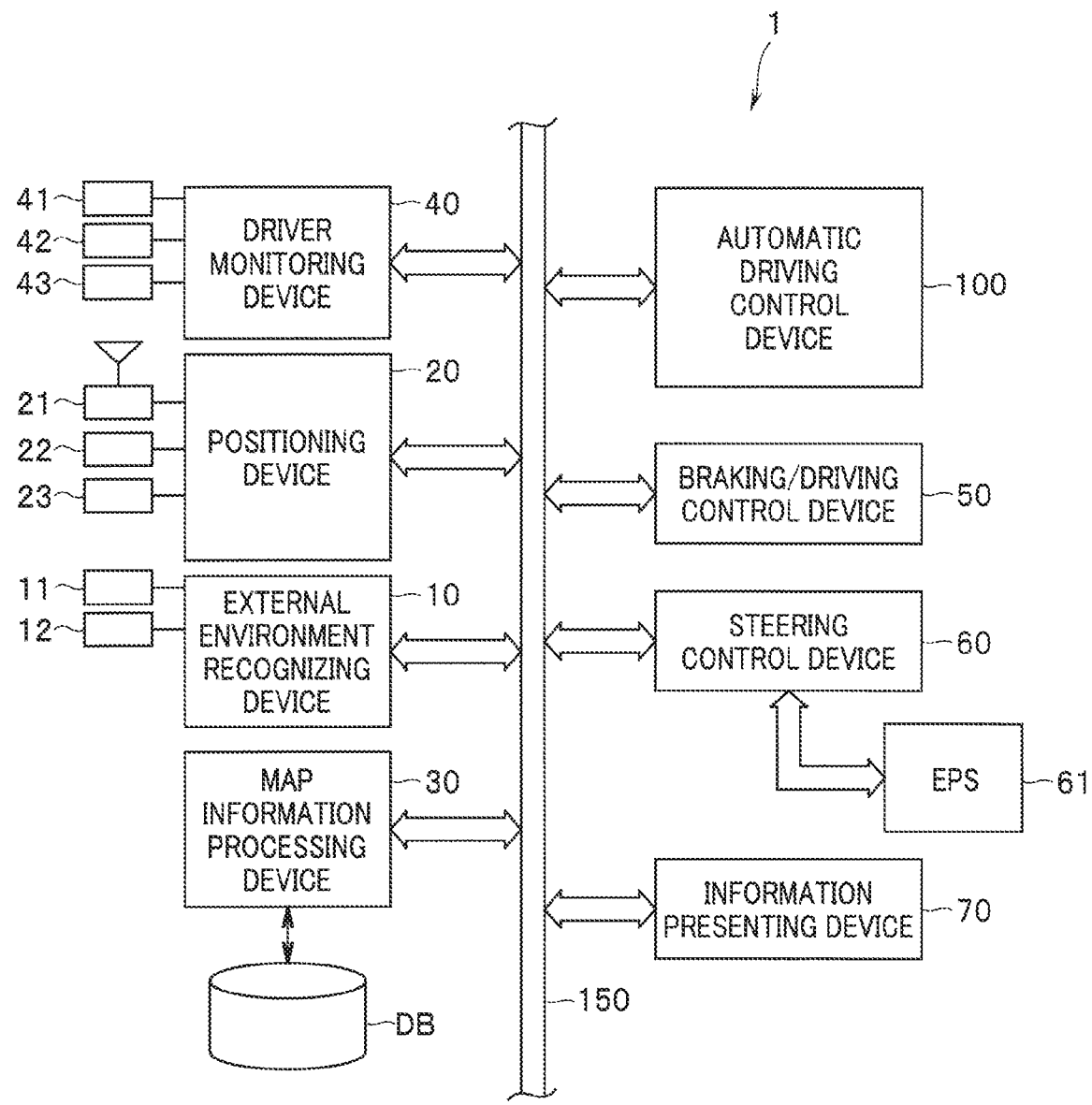
FIG. 1 is an overall configuration diagram of a driving control system.

An embodiment of the technology will be described below with reference to the drawings. FIG. 1 is an overall configuration diagram of a driving control system. The driving control system 1 illustrated in FIG. 1 is installed in a vehicle such as an automobile, and enables driving support for supporting a driver's driving operation and automatic driving that does not require the driver's driving operation. Specifically, the driving control system 1 is configured by connecting an automatic driving control device 100 serving as a main component, an external environment recognition device 10, a positioning device 20, a map information processing device 30, a driver monitoring device 40, a braking/driving control device 50, a steering control device 60, an information presenting device 70 and the like to one another through a communication bus 15 in a network connection style.

The external environment recognition device 10 recognizes an external environment around a vehicle (own vehicle) in which the driving control system 1 is installed. The external environment recognition device 10 includes various devices configured to recognize an environment, such as a camera unit 11 and a radar device 12 such as a millimeter wave radar or a laser radar. The external environment recognition device 10 recognizes an external environment around the own vehicle based on detection information on objects around the own vehicle detected by the camera unit 11, the radar device 12, etc., traffic information acquired by infrastructure communication such as road-to-vehicle communication and vehicle-to-vehicle communication, position information of the own vehicle measured by the positioning device 20, map information from the map information processing device 30, and the like.

In the external environment recognition device 10, for example, when a stereo camera including two cameras configured to capture images of the same object from different viewpoints is mounted as the camera unit 11 in the own vehicle. The external environment recognition device 10 performs stereo processing on a pair of right and left images captured by the stereo camera, to recognize the external environment three-dimensionally. The camera unit 11 as the stereo camera is configured, for example, by arranging two shutter-synchronized color cameras each having an imaging element such as CCD or CMOS on right and left sides in a vehicle width direction with a predetermined baseline length in the vicinity of a room mirror located at an upper part of the vehicle compartment inside the windshield.

The pair of right and left images captured by the camera unit 11 as the stereo camera is subjected to matching processing to determine a pixel shift amount (parallax) at corresponding positions between the right and left images, and the pixel shift amount is converted into luminance data or the like to generate a distance image. Points on the distance image are coordinate-transformed to points in a real space with the own vehicle centered therein according to the principle of triangulation, and lane lines (lane) of a road on which the own vehicle travels, obstacles, vehicles traveling ahead of the own vehicle, etc., are three-dimensionally recognized.

Road lane lines as a lane can be recognized by extracting a point group as candidates for lane lines from an image and calculating a straight line or a curved line connecting the candidate points. For example, within a lane line detection region set on the image, edges which change in luminance by a predetermined value or more on a plurality of search lines set in a horizontal direction (vehicle width direction) are detected, and a pair of a lane line start point and a lane line end point are detected for each search line, whereby an intermediate region between the lane line start point and the lane line end point is extracted as lane line candidate points.

Time-series data of spatial coordinate positions of lane line candidate points based on a vehicle movement amount per unit time are processed to calculate a model approximating the right and left lane lines, thereby recognizing the lane lines. As a lane line approximating model, an approximate model obtained by connecting linear components obtained by the Hough transform, or a model approximated by a curve such as a quadratic equation can be used.

The positioning device 20 mainly performs positioning based on signals from a plurality of navigation satellites such as Global Navigation Satellite System (GNSS) satellites, and detects the vehicle position of the own vehicle. When the positioning accuracy deteriorates due to a capturing state of signals (radio waves) from satellites, the influence of multipath caused by reflection of radio waves or the like, the positioning device 20 detects the vehicle position of the own vehicle by performing the positioning based on autonomous navigation using in-vehicle sensors such as a gyro sensor 22 and a vehicle speed sensor 23 in combination.

According to the positioning based on the plurality of navigation satellites, signals containing information on the orbit, time, etc., transmitted from the navigation satellites are received via a receiver 21, and the own position of the own vehicle is calculated as an absolute position containing longitude, latitude, altitude, and time information based on the received signals. Furthermore, according to the positioning based on the autonomous navigation, the position of the own vehicle as a relative positional change is measured based on the traveling azimuth of the own vehicle detected by the gyro sensor 22 and the moving distance of the own vehicle calculated from a vehicle speed pulse output from the vehicle speed sensor 23.

The map information processing device 30 includes a map database DB, and specifies the position on map data of the map database DB from position data of the own vehicle measured by the positioning device 20 and outputs the specified position. The map database DB is a database that holds a high-precision map created for control of traveling containing automatic driving, and is stored in a large-capacity storage medium such as a hard disk drive (HDD) or a solid state drive (SSD).

Specifically, the high-precision map is configured as a multi-dimensional map (dynamic map) that holds, in multiple layers, static information such as road shapes and connection relationships among roads and dynamic information such as traffic information collected by infrastructure communication. Road data include the types of road lane lines, the number of traveling lanes, widths of the traveling lanes, point sequence data indicating the center position in a width direction of the traveling lane, curvature of the traveling lane, a traveling azimuth angle of the traveling lane, a speed limit, etc., and are stored together with attribute data such as data reliability and data update date.

Further, the map information processing device 30 performs maintenance management of the map database DB, verifies nodes, links, and data points of the map database DB to keep them in an up-to-date state at all time, and creates and adds new data for areas for which no data exists on the database, thereby configuring a more detailed database. Update of data and addition of new data in the map database DB are performed by collating the position data measured by the positioning device 20 with the data stored in the map database DB.

The driver monitoring device 40 functions as a driver monitor configured to monitor, as a driver, an occupant who is capable of performing a driving operation in a vehicle compartment, with respect to the automatic driving control device 100. The driver monitoring device 40 detects a driver state, and transmits the detected driver state to the automatic driving control device 100. The driver state includes the driver's wakefulness level and physical condition, a motion associated with a driver's driving operation, and the like. The driver state is detected by a plurality of sensors such as a visual sensor 41, a biological sensor 42, and a cancel switch 43 for canceling the retreat mode to be described later, which are installed in the vehicle. A camera, a near infrared LED, a radar, an ultrasonic sensor, or the like installed in the vehicle is used as the visual sensor 41. A camera, a near infrared LED, a radar, an ultrasonic sensor, a temperature sensor, a vibration sensor, or the like is used as the biological sensor 42.

The driver monitoring device 40 detects a driver's facial expression, a driver's hand motion, etc., by the visual sensor 41, and also detects biological information such as the presence or absence of driver's breathing, heart rate, blood pressure, body temperature, and brain waves. As described later, the automatic driving control device 100 determines, based on information from the driver monitoring device 40, whether the driver is in a state capable of driving normally.

The braking/driving control device 50 controls traveling driving force to be generated by an electric motor or an internal combustion engine, and also controls the traveling speed of the own vehicle, switching between forward driving and reverse driving, braking, and the like. For example, the braking/driving control device 50 controls an operating state of the engine based on signals from various sensors configured to detect the operating state of the engine and various control information acquired via the communication bus 150, and controls braking devices (not illustrated) for four wheels independently of the driver's braking operation, based on a brake switch, wheel speeds of the four wheels, a steering angle, a yaw rate, and other information on the vehicle. Furthermore, the braking/driving control device 50 calculates brake fluid pressure of each wheel, based on braking force of each wheel, and performs control of an anti-lock braking system, sideslip prevention control and the like.

The steering control device 60 controls the steering torque by an electric power steering device (EPS) 61 provided in a steering system, for example, based on the vehicle speed, the driver's steering torque, the steering angle, the yaw rate, and other information on the vehicle. The control of the steering torque is executed as current control for the electric motor of the EPS device 61 that realizes a target steering torque for making the actual steering angle coincide with the target steering angle. The EPS device 61 uses the target steering torque from the steering control device 60 as an instruction torque to control driving current of the electric motor corresponding to the instruction torque by PID control, for example.

The information presenting device 70 is a device configured to control outputs of an alarm when abnormality occurs in various devices of the vehicle, an alarm for alerting the driver, and output of various kinds of information to be presented to the driver. For example, warnings and control information are presented by using at least one of a visual output such as a monitor, a display or an alarm lamp, or an auditory output such as a speaker or a buzzer. During execution of the traveling control containing automatic driving, the information presenting device 70 presents a control state of the traveling control to the driver, and when the traveling control containing the automatic driving is suspended by a driver's operation, the information presenting device 70 presents a driving state at that time to the driver.

Next, the automatic driving control device 100 serving as a main component of the driving control system 1 will be described. When the driver operates a switch, a panel (not illustrated) or the like to select the driving support mode for supporting the driver's driving operation or the automatic driving mode requiring no driver's driving operation, when the driving mode is the manual driving mode in which the driver drives the own vehicle by performing all the driving operations such as steering, acceleration and braking, the automatic driving control device 100 performs traveling control via the braking/driving control device 50 and the steering control device 60 based on the information from the external environment recognition device 10, the positioning device 20, and the map information processing device 30.

Note that in the present embodiment, the driving support mode means a driving mode which automatically performs at least one of acceleration/deceleration control or steering control, with the driver being required to hold the steering wheel or steer. The driving support mode contains partially automatic driving. On the other hand, the automatic driving mode means a driving mode presupposing hands-off driving in which the driver does not touch the steering wheel, and is a conditional automatic driving mode in which all of the acceleration/deceleration control and the steering control are automatically performed in an operation region in design where the automatic driving function operates normally. In the automatic driving mode, when it is difficult to continue the operation by the system, the driving is entrusted to the driver.

Figure 2:
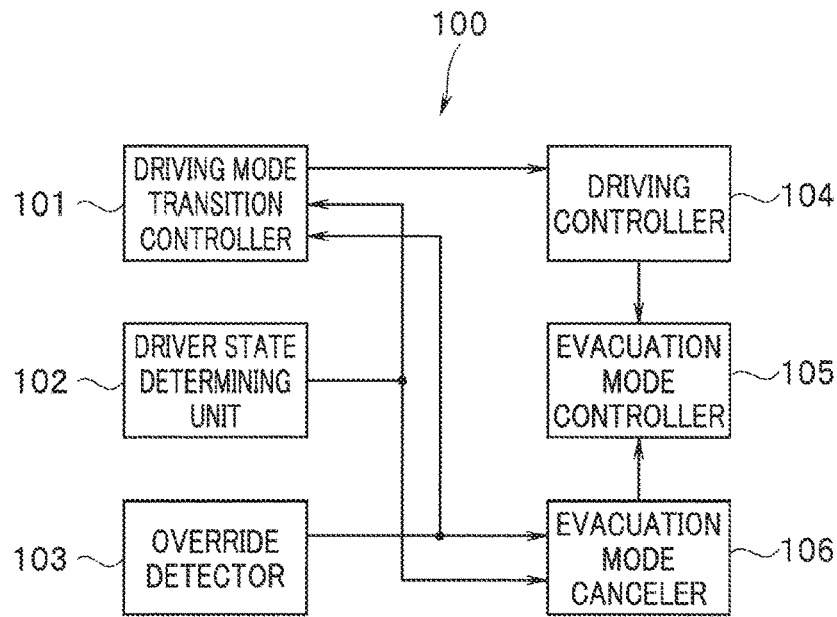
FIG. 2 is a block diagram illustrating functions of an automatic driving control device.

The automatic driving control device 100 includes a control function unit associated with each operation mode as described above. FIG. 2 is a block diagram illustrating functions of the automatic driving control device. As illustrated in FIG. 2, the automatic driving control device 100 includes a driving mode transition controller 101, a driver state determining unit 102, an override detector 103, a driving controller 104, a retreat mode controller 105, and a retreat mode canceler 106. The driving controller 104 mainly performs control in the automatic driving mode, and also performs control in the driving support mode.

The driving mode transition controller 101 determines the driving mode of the own vehicle according to an operation input by the driver from a driving mode setting switch, an operation panel, or the like, and notifies the driving controller 104 of the driving mode. In the present embodiment, the operation mode is set to the manual driving mode in an initial state when the system is activated, and the driving mode transition controller 101 transitions the driving mode among the manual driving mode, the driving support mode, and the automatic driving mode based on the information from the driver state determining unit 102 and the override detector 103.

Based on the driver state detected by the visual sensor 41 and the biological sensor 42 in the driver monitoring device 40 as the driver monitor, the driver state determining unit 102 determines whether the driver can normally drive the own vehicle. For example, as a driver state, a visual-line behavior based on movement of a virtual image on a cornea caused by a driver's eye movement, the wakefulness level based on variation of the visual-line behavior and change of the pupil area, the presence or absence of driver's breathing, biological information such as heart rate, blood pressure, body temperature and brain waves, driver's face orientation, motion of driver's hands, etc. are detected. The driver state determining unit 102 determines whether the driver can normally drive the own vehicle based on these pieces of information.

When the driver state determining unit 102 detects, from the orientation of the driver's face, an eye-opening state, and change in the direction of the visual line, that the driver is at least gazing in a traveling direction, the driver state determining unit 102 determines that the driver is in the state capable of driving normally. On the other hand, when the driver state determining unit 102 detects that the driver performs inattentive driving while looking in a direction other than the traveling direction for a predetermined period of time or more, although the driver does not change the lane or there is no vehicle on an adjacent lane, or performs drowsy driving, with the pupil area decreased to a threshold value or less for a predetermined period of time or more, or detects that the driver's biological information is out of a preset reference value, the driver state determining unit 102 determines that the driver's health condition has deteriorated and the driver is not in the state capable of driving normally.

After determining that the driver's health condition has deteriorated and thus the driver is not in the state capable of driving normally, the driver state determining unit 102 checks the driver state again to determine whether the driver's health condition has recovered to the normal state and the driver has returned to the state capable of driving normally. For example, when detecting that the driver is gazing in the traveling direction, and further detecting at least one of the state that the driver is holding the steering wheel, or the state that the motion of the driver's hands is the same as a pre-registered specific hand motion (hand gesture), the driver state determining unit 102 determines that the driver's health has been recovered and the driver has returned to the state capable of driving normally.

The override detector 103 detects an override operation for canceling the automatic driving mode and transitioning to the manual driving mode by the driver. For example, when the driver takes an action such as holding the steering wheel, steering with a steering torque of a set value or more, stepping on a brake pedal, or stepping on an accelerator pedal during traveling under the automatic driving, the override detector 103 detects these driver's actions as an override operation based on sensing information from a touch sensor, a steering torque sensor or the like, and the information from the driver monitoring device 40, and notifies the driving mode transition controller 101.

When the driving mode notified from the driving mode transition controller 101 is the automatic driving mode, and a road condition, a geographical condition, an environmental condition, etc., satisfy an automatic driving condition, the driving controller 104 automatically performs the acceleration/deceleration control and the steering control of the own vehicle. In the automatic driving, when a destination and a traveling route are specified in advance, automatic traveling is performed to the destination along the traveling route while appropriately setting the vehicle speed according to a surrounding traffic environment, the distances to other vehicles, and a lane. When neither a destination nor a traveling route is specified, automatic traveling is performed along the lane.

Note that when a driver's override operation is detected by the override detector 103, the automatic driving by the driving controller 104 is stopped, and the driving mode is transitioned from the automatic driving mode to the manual driving mode.

When a condition under which the automatic driving can be continued (automatic driving condition) is not satisfied during the traveling under automatic driving, the driving controller 104 outputs a takeover request for requesting the driver to take over the driving. For example, when it becomes difficult to continue the automatic driving because abnormality occurs in a part of the system or the traveling region of the vehicle is outside the operation range of the automatic driving or the like, or when the driver state determining unit 102 detects driver's inattentive driving or drowsy driving or determines that the driver is not in the state capable of driving normally because deterioration of driver's physical condition is detected, it is determined that the automatic driving condition is not satisfied, control information on the vehicle position and speed, etc., in automatic driving up to that time point is stored, and the takeover request for requesting the driver to take over the driving is output.

The takeover request is notified to the driving mode transition controller 101, and also alerted to the driver via the information presenting device 70. When the driver reacts to the alert, to confirm forward and operates the steering wheel, the brake pedal or the like, alarm cancel is instructed from the driving mode transition controller 101 to the information presenting device 70, and stop of the control in the automatic driving mode is instructed to the driving controller 104. As a result, the driving mode is transitioned from the automatic driving mode to the manual driving mode to be controlled by the driver himself/herself.

On the other hand, when the driver does not respond to the takeover request, the driving mode transition controller 101 instructs the driving controller 104 to stop the automatic driving, and also instructs the retreat mode controller 105 to perform retreat traveling in the retreat mode. The retreat mode is one of risk reduction modes during the automatic driving, and is a driving mode for searching a place (retreat place) such as a roadside belt where the vehicle can be stopped safely in the control state of the automatic driving until the time point when the takeover request is output, and causing the vehicle to travel to the retreat place. In the retreat mode, the retreat mode controller 105 normally disables the driver's override operation and disables the transition to the manual operation mode in order to ensure safety against an operation unintended by the driver.

For example, even when a driver's override operation is detected by the override detector 103, the retreat mode controller 105 disables the driver's override operation by ignoring the detection of the driver's override operation or by causing the override detector 103 to stop detection of the override operation. When the driver turns on the cancel switch 43 after the own vehicle has reached the retreat place and the driver stops a traveling driving source such as the electric motor, the engine or the like, the retreat mode is canceled by the retreat mode canceler 106.

Even during the retreat mode, if the driver state determining unit 102 determines that the driver can normally drive, the retreat mode canceler 106 cancels the retreat mode, and makes the driver's override operation enabled, that is, detectable. By enabling the override operation, it is possible to detect the driver's override operation even during the retreat traveling and transition the driving mode to the manual driving mode, and further it is possible to transition the driving mode to the driving support mode.

The retreat mode canceler 106 acquires control information for the automatic driving until the driving mode has been transitioned to the retreat mode and control information until the retreat mode has been canceled, from the driving controller 104 and the retreat mode controller 105, respectively. Furthermore, the retreat mode canceler 106 acquires external environment information around the own vehicle at the time of cancellation of the retreat mode from the external environment recognition device 10. By the retreat mode canceler 106 determining based on these pieces of information whether the automatic traveling can be resumed, it is possible to return to the automatic driving mode after canceling the retreat mode.

Figure 3:
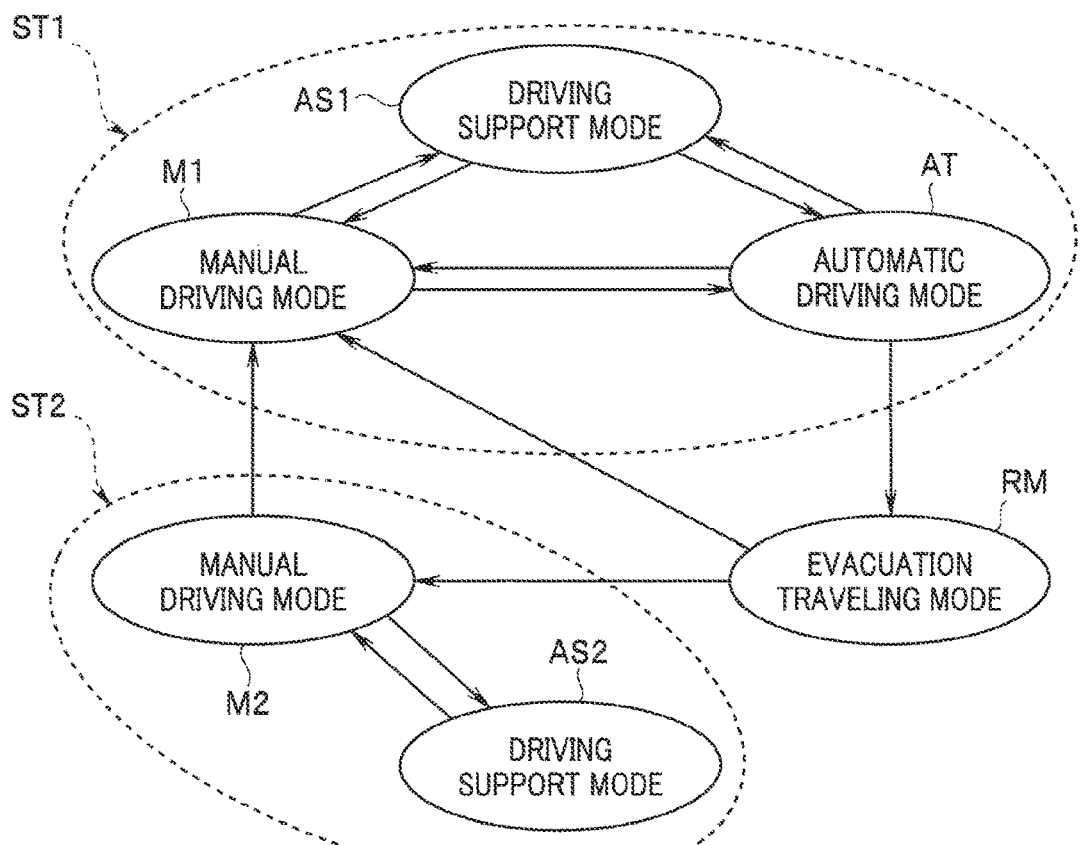
FIG. 3 is an explanatory diagram illustrating transition of a driving mode.

Here, the transition among the respective driving modes will be described. FIG. 3 is an explanatory diagram illustrating the transition of the driving mode. In the present embodiment, as illustrated in FIG. 3, the transition among the respective driving modes includes transitions in a state ST1 and transitions in a state ST2.

The state ST1 represents a normal state before the transition to the retreat mode for risk reduction occurs, and the driving mode can be transitioned among a manual driving mode M1, a driving support mode AS1, and an automatic driving mode AT. The state ST2 represents a state after the retreat mode for risk reduction is canceled halfway, and the driving mode can be transitioned between a manual driving mode M2 and a driving support mode AS2.

The manual driving mode M1 and the manual driving mode M2 are the same manual driving mode, but are different in the transition-allowable range. Likewise, the driving support mode AS1 and the driving support mode AS2 are the same driving support mode, but are different in the transition-allowable range.

A retreat mode RM at the time of risk occurrence is interposed between the state ST1 and the state ST2. When the driving mode transitions from the automatic driving mode AT to the retreat mode RM, there are a case where the driving mode transitions from the retreat mode RM to the manual driving mode M1 in the state ST1 because the retreat mode RM has terminated, and a case where the retreat mode RM is canceled halfway through the retreat mode RM, and the driving mode transitions from the retreat mode RM to the manual driving mode M2 in the state ST2.

When the driving mode transitions to the manual driving mode M1 in the state ST1 because the retreat mode RM has terminated, the driving mode can be transitioned between the normal driving modes. For example, even when the driving mode has transitioned to the retreat mode RM during automatic traveling to a destination, it is possible to confirm safety at a retreat place and then resume the automatic traveling to the destination.

On the other hand, when the driving mode transitions to the manual driving mode M2 in the state ST2 halfway through the retreat mode RM, the transition-allowable driving mode is temporarily restricted. Only the transition between the manual driving mode M2 and the driving support mode AS2 is possible until the restriction on the mode transition is canceled, and the automatic traveling in the automatic driving mode AT is not permitted. When the restriction on the mode transition is canceled, the driving mode transitions from the state ST2 to the state ST1.

For example, when the vehicle has traveled for a certain period of time in a state where the driver state determining unit 102 detects that the driver confirms forward and holds the steering wheel, the retreat mode canceler 106 determines that a condition for canceling the restriction on the mode transition is satisfied. As a result, the state ST2 is transitioned to the normal state ST1, and it is possible to perform the transition among the manual driving mode M1, the driving support mode AS1, and the automatic driving mode AT.

Figure 4:
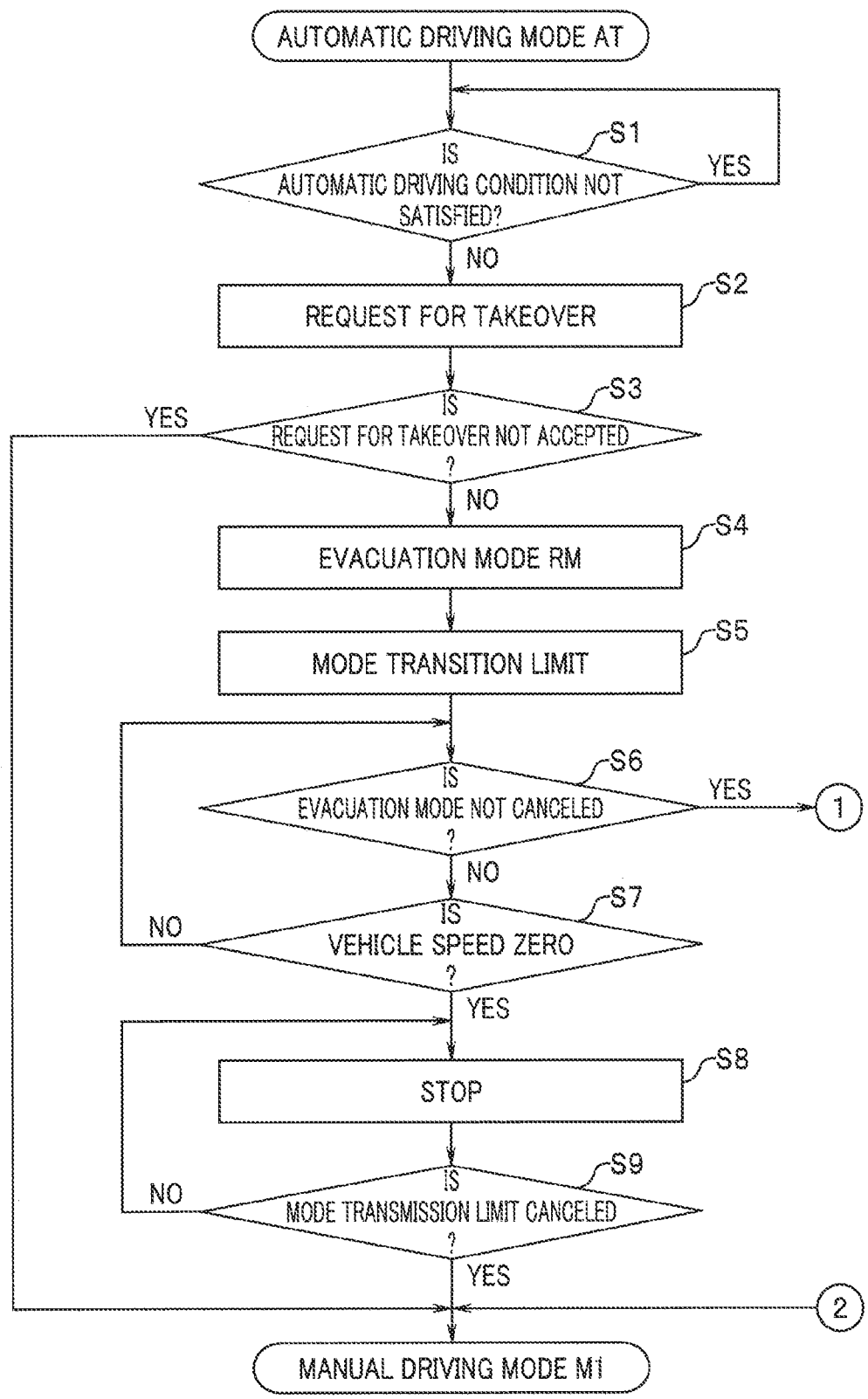
FIG. 4 is a flowchart illustrating driving mode transition processing.
Figure 5:
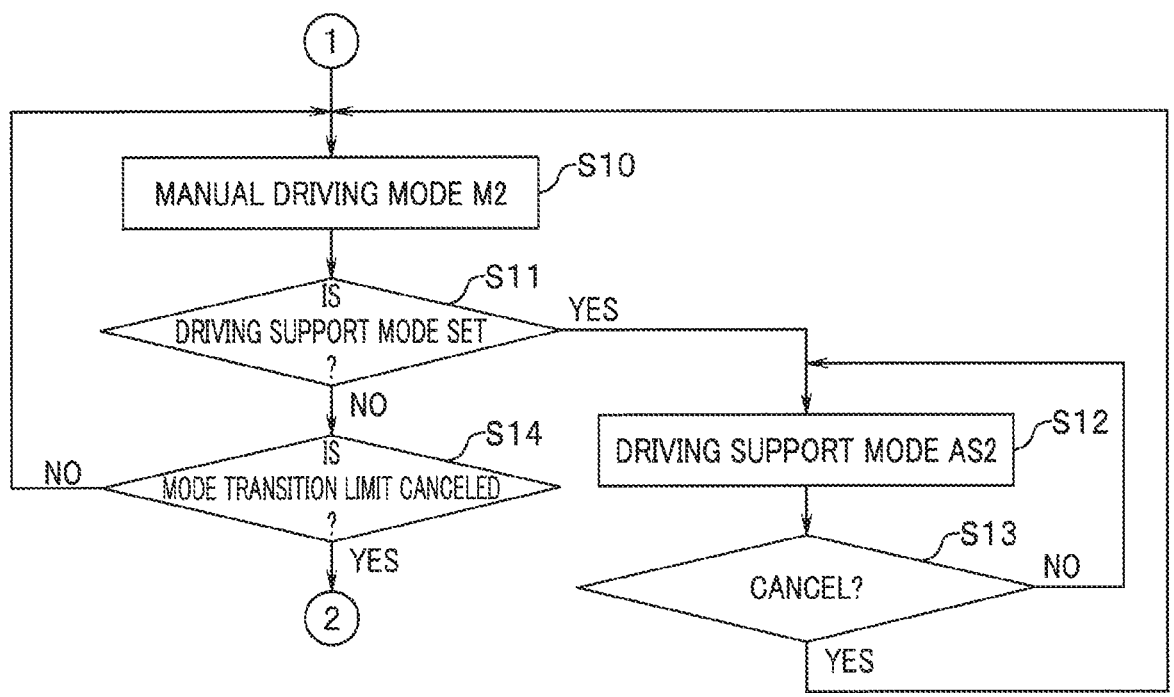
FIG. 5 is a subsequent flowchart of the flowchart in FIG. 4.

Next, operations associated with the transition of the driving mode in the driving control system 1 will be described focusing on the operation of the automatic driving control device 100. FIGS. 4 and 5 are flowcharts illustrating driving mode transition processing during automatic driving.

In the driving mode transition processing, the automatic driving control device 100 checks in first step S1 whether the automatic driving condition is not satisfied due to system abnormality, deterioration of the driver's physical condition or the like, and the automatic driving cannot be continued. When the automatic driving condition is not satisfied, the automatic driving control device 100 outputs a takeover request for requesting the driver to take over the driving in step S2, and checks the driver's response to the takeover request based on the information from the driver monitoring device 40 in step S3.

When confirming that the driver has held the steering wheel in response to the takeover request, the automatic driving control device 100 stops the automatic driving and exits the present processing from step S3. As a result, the driving mode transitions from the automatic driving mode AT to the normal manual driving mode (the manual driving mode M1 in the state ST1).

On the other hand, when the driver does not respond to the takeover request, for example, when the driver cannot normally drive because the driver's physical condition has deteriorated or the like, the automatic driving control device 100 proceeds from step S3 to step S4, and transitions from the control of the automatic driving mode AT to the control of the retreat mode RM. In the control of the retreat mode RM, the driver's override operation is disabled, and the own vehicle is automatically moved to the retreat place by automatic traveling.

In step S5, the automatic driving control device 100 sets a mode transition restriction flag for restricting the transition of the driving mode, and checks in step S6 whether the retreat mode RM remains uncanceled. As described above, the retreat mode RM is canceled when it is determined that the driver has returned to the state capable of driving normally, and the driver's override operation is enabled.

When the retreat mode RM remains uncanceled, the automatic driving control device 100 checks in step S7 whether the own vehicle has reached the retreat place and the vehicle speed decreases to zero. When the vehicle speed is not equal to zero, the processing returns to step S6, and when the vehicle speed becomes zero, the vehicle is stopped in step S8.

After the own vehicle is stopped in step S8, the processing proceeds to step S9, and the automatic driving control device 100 checks whether a condition for clearing the mode transition restriction flag (a condition for canceling the mode transition restriction) is satisfied. For example, when detecting that the traveling drive source such as the electric motor or the engine is stopped and the cancel switch 43 is turned on after the vehicle stops, the automatic driving control device 100 determines that the condition for canceling the mode transition restriction is satisfied, clears the mode transition restriction flag, and exits from the processing. As a result, the retreat mode RM is terminated, and the driving mode transitions to the manual driving mode M1 in the normal state ST1.

On the other hand, in step S6, when it is detected from the information from the driver monitoring device 40 that the driver's physical condition becomes normal and the driver holds the steering wheel to apply a predetermined steering torque in the traveling direction, the automatic driving control device 100 cancels the retreat mode RM in step S10. As a result, the automatic traveling to the retreat place is stopped, and the driving mode transitions to the manual driving mode M2 in the state ST2.

After the driving mode transitioning to the manual driving mode M2 in step S10, the processing proceeds to step S11, and the automatic driving control device 100 checks whether the driver sets the driving support mode. When the driver sets the driving support mode, the automatic driving control device 100 transitions the driving mode to the driving support mode AS2 in the state ST2 in step S12.

The driving support mode AS2 in the state ST2 is a mode that cannot be transitioned to the automatic driving mode AT. When the driving support mode AS2 is canceled in step S13, a loop in which the processing returns to step S10 to transition to the manual driving mode M2 in the state ST2 is formed. In the manual driving mode M2, when the driver is manually driving the vehicle without setting the driving support mode, the automatic driving control device 100 checks in step S14 whether the condition for clearing the mode transition restriction flag is satisfied.

The condition for clearing the mode transition restriction flag in this case is a condition for canceling the restriction on the manual driving mode M2 in the state ST2 and transitioning the driving mode to the manual driving mode M1 of the state ST1. For example, when the vehicle is confirmed to have traveled for a certain period of time in a state where it is detected that the driver confirms forward and holds the steering wheel, the automatic driving control device 100 clears the mode transition restriction flag and exits from the processing. As a result, the driving mode transitions from the manual driving mode M2 of the state ST2 to the manual driving mode M1 in the normal state ST1.

As described above, in the present embodiment, even halfway through the traveling for retreat after the driving mode has transitioned from the automatic driving mode to the retreat mode, when it is determined from the driver state that the driver has returned to the normal drivable state, the retreat mode is canceled. As a result, when the driver has returned to the normal state after transition to the retreat mode, there is no need to wait until the vehicle stops and the retreat mode is terminated, and the retreat mode can be safely canceled without causing the driver to feel bothered.

The driving control system 1 illustrated in FIG. 1 can be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the automatic driving control device 100 including the driver state determining unit 102, the retreat mode controller 105, and the retreat mode canceler 106 (see FIG. 2). Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and an SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the modules shown in FIGS. 1 and 2.

Although some embodiments of the technology have been described in the foregoing by way of example with reference to the accompanying drawings, the technology is by no means limited to the embodiments described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle driving control system having an automatic driving mode that enables traveling without a driving operation by a driver, the vehicle driving control system comprising:
   a driver monitor configured to monitor, as the driver, an occupant who can perform a driving operation in a vehicle compartment, and detect a driver state;
   a driver state determining unit configured to determine, on a basis of the driver state, whether the driver is in a state capable of driving normally;
   a retreat mode controller configured to control a retreat mode that causes an own vehicle to travel for retreat to a place where the own vehicle can safely stop when the driver state determining unit determines, during traveling under the automatic driving mode, that the driver is not in the state capable of driving normally;
   a retreat mode canceler configured to cancel the retreat mode when the driver state determining unit determines, during the travel for retreat, that the driver has returned to the state capable of driving normally; and
   a driving mode transition controller configured to transition a driving mode of the own vehicle among a first manual driving mode, a second manual driving mode, the automatic driving mode, and the retreat mode,
   wherein the driving mode transition controller allows transitioning to the automatic driving mode while traveling under the first manual driving mode, and disallows transitioning to the automatic driving mode while traveling under the second manual driving mode,
   wherein the driving mode transition controller transitions to the retreat mode when the driver state determining unit determines, while traveling under the automatic driving mode, that the driver is not in the state capable of driving normally, and
   wherein the driving mode transition controller transitions to the second manual driving mode when the retreat mode canceler has canceled the retreat mode.

2. The vehicle driving control system according to claim 1, wherein the retreat mode canceler enables a return to the automatic driving mode after canceling the retreat mode.

3. The vehicle driving control system according to claim 1, wherein when detecting on the basis of the driver state that the driver is gazing at least in a traveling direction during the travel for retreat, the driver state determining unit is determines that the driver has returned to the state capable of driving normally.

4. The vehicle driving control system according to claim 2, wherein when detecting on the basis of the driver state that the driver is gazing at least in a traveling direction during the travel for retreat, the driver state determining unit is determines that the driver has returned to the state capable of driving normally.

5. The vehicle driving control system according to claim 3, wherein the driver state determining unit determines that the driver has returned to the state capable of driving normally, when detecting at least one of a state that the driver is holding a steering wheel and a state that the driver's hand motion is same as a pre-registered specific hand motion.

6. The vehicle driving control system according to claim 4, wherein the driver state determining unit determines that the driver has returned to the state capable of driving normally, when detecting at least one of a state that the driver is holding a steering wheel and a state that the driver's hand motion is same as a pre-registered specific hand motion.

7. The vehicle driving control system according to claim 1, wherein the retreat mode canceler cancels the retreat mode when the driver state determining unit determines that the driver has returned to the state capable of driving normally and when the own vehicle travels for a certain period of time in a state where the driver confirms forward and holds a steering wheel.

8. The vehicle driving control system according to claim 2, wherein the retreat mode canceler cancels the retreat mode when the driver state determining unit determines that the driver has returned to the state capable of driving normally and when the own vehicle travels for a certain period of time in a state where the driver confirms forward and holds a steering wheel.

9. The vehicle driving control system according to claim 3, wherein the retreat mode canceler cancels the retreat mode when the driver state determining unit determines that the driver has returned to the state capable of driving normally and when the own vehicle travels for a certain period of time in a state where the driver confirms forward and holds a steering wheel.

10. The vehicle driving control system according to claim 4, wherein the retreat mode canceler cancels the retreat mode when the driver state determining unit determines that the driver has returned to the state capable of driving normally and when the own vehicle travels for a certain period of time in a state where the driver confirms forward and holds a steering wheel.

11. The vehicle driving control system according to claim 5, wherein the retreat mode canceler cancels the retreat mode when the driver state determining unit determines that the driver has returned to the state capable of driving normally and when the own vehicle travels for a certain period of time in a state where the driver confirms forward and holds a steering wheel.

12. The vehicle driving control system according to claim 6, wherein the retreat mode canceler cancels the retreat mode when the driver state determining unit determines that the driver has returned to the state capable of driving normally and when the own vehicle travels for a certain period of time in a state where the driver confirms forward and holds a steering wheel.

13. A vehicle driving control system comprising circuitry configured to operate in an automatic driving mode for enabling traveling without a driving operation by a driver, the circuitry being configured to
monitor, as the driver, an occupant who can perform a driving operation in a vehicle compartment, and detect a driver state,
determine, on a basis of the driver state, whether the driver is in a state capable of driving normally,
control a retreat mode that causes an own vehicle to travel for retreat to a place where the own vehicle can safely stop when it is determined, during traveling under the automatic driving mode that the driver is not in the state capable of driving normally, and
cancel the retreat mode when it is determined, during the travel for retreat, that the driver has returned to the state capable of driving normally,
transitioning a driving mode of the own vehicle among a first manual driving mode, a second manual driving mode, the automatic driving mode, and the retreat mode,
wherein the driving mode transitions to the automatic driving mode while traveling under the first manual driving mode, and the driving mode does not transition to the automatic driving mode while traveling under the second manual driving mode,
wherein the driving mode transitions to the retreat mode when it is determined, while traveling under the automatic driving mode, that the driver is not in the state capable of driving normally, and
wherein the driving mode transitions to the second manual driving mode when the retreat mode is cancelled.

14. The vehicle driving control system according to claim 1, wherein the retreat mode controller is configured to disable the driver's override operation while traveling under the retreat mode.

15. The vehicle driving control system according to claim 1, wherein the driving mode transition controller transitions to the first manual driving mode from the second manual driving mode when the driver state determining unit determines that the driver has returned to the state capable of driving normally, when detecting at least one of a state that the driver is holding a steering wheel and a state that the driver's hand motion is same as a pre-registered specific hand motion.

* * * * *